(12) United States Patent
Oh et al.

(10) Patent No.: US 12,468,075 B2
(45) Date of Patent: *Nov. 11, 2025

(54) GRAPHENE PLASMON RESONATORS

(71) Applicant: Regents of the University of Minnesota, Minneapolis, MN (US)

(72) Inventors: Sang-Hyun Oh, Plymouth, MN (US); In-Ho Lee, Minneapolis, MN (US); Tony Low, Woodbury, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 7 days.

This patent is subject to a terminal disclaimer.

(21) Appl. No.: 18/400,780

(22) Filed: Dec. 29, 2023

(65) Prior Publication Data

US 2024/0319413 A1    Sep. 26, 2024

Related U.S. Application Data

(62) Division of application No. 16/894,314, filed on Jun. 5, 2020, now Pat. No. 11,885,985.

(Continued)

(51) Int. Cl.
  *G02B 5/00*  (2006.01)
  *G02B 6/122*  (2006.01)
  (Continued)

(52) U.S. Cl.
  CPC .......... *G02B 5/008* (2013.01); *G02B 6/1226* (2013.01); *G01N 2021/258* (2013.01); *G02B 2006/12166* (2013.01); *G02F 2203/10* (2013.01)

(58) Field of Classification Search
  CPC .............. G02B 5/008; G02B 6/1226; G02B 2006/12166; G01N 2021/258; G02F 2203/10
  See application file for complete search history.

(56) References Cited

U.S. PATENT DOCUMENTS 9,417,387 B2  8/2016 Avouris et al.
9,423,345 B2  8/2016 Avouris et al.
(Continued)

FOREIGN PATENT DOCUMENTS

CN  103633183  3/2014
CN  104716924  6/2015
(Continued)

OTHER PUBLICATIONS

Liu et al. "A graphene-based broadband optical modulator" Nature 474, 64-67 (2011). https://doi.org/10.1038/nature10067 (Year: 2011).*

(Continued)

*Primary Examiner* — George G. King
(74) *Attorney, Agent, or Firm* — Fish & Richardson P.C.

(57) ABSTRACT

The subject matter of this specification can be embodied in, among other things, a graphene plasmon resonator that includes a planar patterned layer having a collection of electrically conductive segments, and a collection of dielectric segments, each dielectric segment defined between a corresponding pair of the electrically conductive segments, a graphene layer substantially parallel to the planar patterned layer and overlapping the collection of electrically conductive segments, and a planar dielectric layer between the planar patterned layer and the graphene layer.

15 Claims, 9 Drawing Sheets

Related U.S. Application Data

(60) Provisional application No. 62/857,434, filed on Jun. 5, 2019.

(51) Int. Cl.
    *G01N 21/25*       (2006.01)
    *G02B 6/12*        (2006.01)

(56) References Cited

U.S. PATENT DOCUMENTS

| | | | |
|---|---|---|---|
| 9,722,110 | B2 | 8/2017 | Wu et al. |
| 11,688,820 | B2 | 6/2023 | Oh et al. |
| 11,885,985 | B2 * | 1/2024 | Oh .............. G02F 1/31 |
| 2014/0105553 | A1 | 4/2014 | Kim et al. |
| 2016/0033401 | A1 | 2/2016 | Farmer |
| 2016/0161675 | A1 | 6/2016 | Englund et al. |
| 2017/0249520 | A1 | 8/2017 | Lee |
| 2018/0361400 | A1 | 12/2018 | Oh et al. |
| 2020/0387044 | A1 | 12/2020 | Oh et al. |
| 2021/0111298 | A1 | 4/2021 | Oh et al. |

FOREIGN PATENT DOCUMENTS

| | | | |
|---|---|---|---|
| CN | 105355702 | | 2/2016 |
| CN | 106596449 | | 4/2017 |
| CN | 107561028 | | 1/2018 |
| CN | 108593590 | | 9/2018 |
| CN | 111521307 | A * | 8/2020 ............. G01L 1/241 |
| KR | 101177715 | | 8/2012 |
| KR | 102187443 | | 12/2020 |
| WO | WO 2013/110803 | | 8/2013 |

OTHER PUBLICATIONS

U.S. Appl. No. 17/066,735, filed Oct. 9, 2020, Sang-Hyun Oh, now U.S. Pat. No. 11,688,820.
Alonso-Gonzalez et al., "Acoustic terahertz graphene plasmons revealed by photocurrent nanoscopy," Nat. Nanotechnology, Jan. 2017, 12(1):31-36.
Autore et al., "What momentum mismatch?" Nat. Nanotechnology, Feb. 11, 2019, 14:308-309.
BakmanTechnologies.com [online], "Terahertz Sensors, Components and Systems," available No. later than Feb. 22, 2019, retrieved on Aug. 18, 2023, retrieved from URL<https://www.bakmantechnologies.com/index.php#bt-image-6>.
Cakmakyapan et al., "Gold-patched graphene nano-stripes for high-responsivity and ultrafast photodetection from the visible to infrared regime," Light Sci. Appl., Jun. 2018, 7:20.
Chalabi et al., "Hot-Electron Photodetection with a Plasmonic Nanostripe Antenna," Nano Letters, Mar. 2014, 14(3):1374-1380.
Chen et al., "Acoustic Graphene Plasmon Nanoresonators for Field-Enhanced Infrared Molecular Spectroscopy," ACS Photonics, Oct. 9, 2017, 4(12):3089-3097.
Desiatov et al., "Plasmonic enhanced silicon pyramids for internal photoemission Schottky detectors in the near-infrared regime," Optica, Apr. 2015, 2(4):335-338.
Diaconescu et al., "Low-energy acoustic plasmons at metal surfaces," Nature Lett., Jul. 2007, 448:57-59, 9 pages.
Gong et al., "Angle-Independent Hot Carrier Generation and Collection Using Transparent Conducting Oxides," Nano Letters, Jan. 2015, 15(1):147-152.
Gong et al., "Noble Metal Alloys for Plasmonics," ACS Photonics, Apr. 2016, 3(4):507-513.
Grigorenko et al., "Graphene plasmonics," Nature Photonics, Nov. 2012, 6:749-758.
Iranzo et al., "Probing the ultimate plasmon confinement limits with a van der Waals heterostructure," Science, Apr. 20, 2018, 360(6386):291-295.
Knights et al., "Photodetection with Active Optical Antennas," Science, May 6, 2011, 332:702-704.
Koppens et al., "Graphene Plasmonics: A Platform for Strong Light-Matter Interactions," Nano Lett., Aug. 2011, 11(8):3370-3377.
Kundu et al., "Surface enhanced infrared absorption (SEIRA) spectroscopy on nanoshell aggregate substrates," Chem. Phys. Lett., Feb. 2008, 452(1-3):115-119.
Lee et al., "Graphene acoustic plasmon resonator for ultrasensitive infrared spectroscopy," Nat. Nanotechnology, Feb. 11, 2019, 14:313-319.
Li et al., "Harvesting the loss: surface plasmon-based hot electron photodetection," Nanophotonics, Jun. 2017, 6(1):177-191.
Li et al., "Metamaterial Perfect Absorber Based Hot Electron Photodetection," Nano Letters, Jun. 2014, 14(6):3510-3514.
Lundeberg et al., "Tuning quantum nonlocal effects in graphene plasmonics," Science, Jul. 14, 2017, 357(6347):187-191.
Ogawa et al. "Effect of graphene on plasmonic metasurfaces at infrared wavelengths" AIP Advances, https://doi.org/10.1063/1.4834976 (Year: 2013).
Otsuji et al., "Active graphene plasmonics for terahertz device applications," J. Phys. D: Appl. Phys., 2014, 47(9):094006.
Ozbay, "Plasmonics: Merging Photonics and Electronics at Nanoscale Dimensions," Science, Jan. 2006, 311(5758):189-193.
Pawar et al., "Terahertz technology and its applications," Drug Invention Today, Jun. 2013, 5(2):157-163.
Pisarra et al., "Acoustic plasmons in extrinsic free-standing graphene," New J. Phys., 2014, 16:083003, 11 pages.
Rodrigo et al., "Mid-infrared plasmonic biosensing with graphene," Science, Jul. 10, 2015, 349(6244):165-168.
Silkin et al., "Acoustic surface plasmons in the noble metals Cu, Ag, and A," Phys. Rev. B, Sep. 2005, 72:115435, 7 pages.
Sobhani et al., "Narrowband photodetection in the near-infrared with a plasmon-induced hot electron device," Nat. Communications, Mar. 27, 2013, 4:1643, 6 pages.
TeraSense.com [online], "Terahertz Sources," available no later than Feb. 22, 2019, retrieved on Aug. 18, 2023, retrieved from URL<http://terasense.com/products/terahertz-sources/>.
UMN.edu [online], "Graphene: Technologies, Applications, and Markets," Feb. 2016, retrieved on Sep. 5, 2023, retrieved from URL<https://www-bccresearch-com.ezp1.lib.umn.edu/market-research/advanced-materials/graphene-technologies-applications-markets-report-avm075d.html>.
UMN.edu [online], "Infrared Sensors: Technologies and Global Markets," Apr. 2015, retrieved on Sep. 5, 2023, retrieved from URL<https://www-bccresearch-com.ezp1.lib.umn.edu/market-research/instrumentation-and-sensors/infrared-sensors-technologies-markets-report-ias100a.html>.
UMN.edu [online], "Terahertz Radiation Systems: Technologies and Global Markets," Jun. 2017, retrieved on Sep. 5, 2023, retrieved from URL<https://www-bccresearch-com.ezp1.lib.umn.edu/market-research/instrumentation-and-sensors/terahertz-radiation-systems-markets-report-ias029e.html >.
UMN.edu [online], "The Maturing Nanotechnology Market: Products and Applications," Nov. 2016, retrieved on Sep. 5, 2023, retrieved from URL<https://www-bccresearch-com.ezp1.lib.umn.edu/market-research/nanotechnology/nanotechnology-market-products-applications-report-nan031g.html>.
Wei et al. "Cavity-enhanced continuous graphene plasmonic resonator for infrared sensing" Optical Communications, 395, pp. 147-153 (Year: 2017).
West et al., "Searching for better plasmonic materials," Laser Photonics Rev., 2010, 4(6):795-808.
Yan et al., "Damping pathways of mid-infrared plasmons in graphene nanostructures," Nat. Photonics, May 2013, 7(5):394-399.
Yan et al., "Tunable infrared plasmonic devices using graphene/insulator stacks," Nat. Nanotechnology, 7(5):330-334.
Yoo et al., "High-Contrast Infrared Absorption Spectroscopy via Mass-Produced Coaxial Zero-Mode Resonators with Sub-10 nm Gaps," Nano Letters, Mar. 2018, 18(3):1930-1936.
Yoo et al., "High-Throughput Fabrication of Resonant Metamaterials with Ultrasmall Coaxial Apertures via Atomic Layer Lithography," Nano Letters, Mar. 2016, 16(3):2040-2046.

* cited by examiner

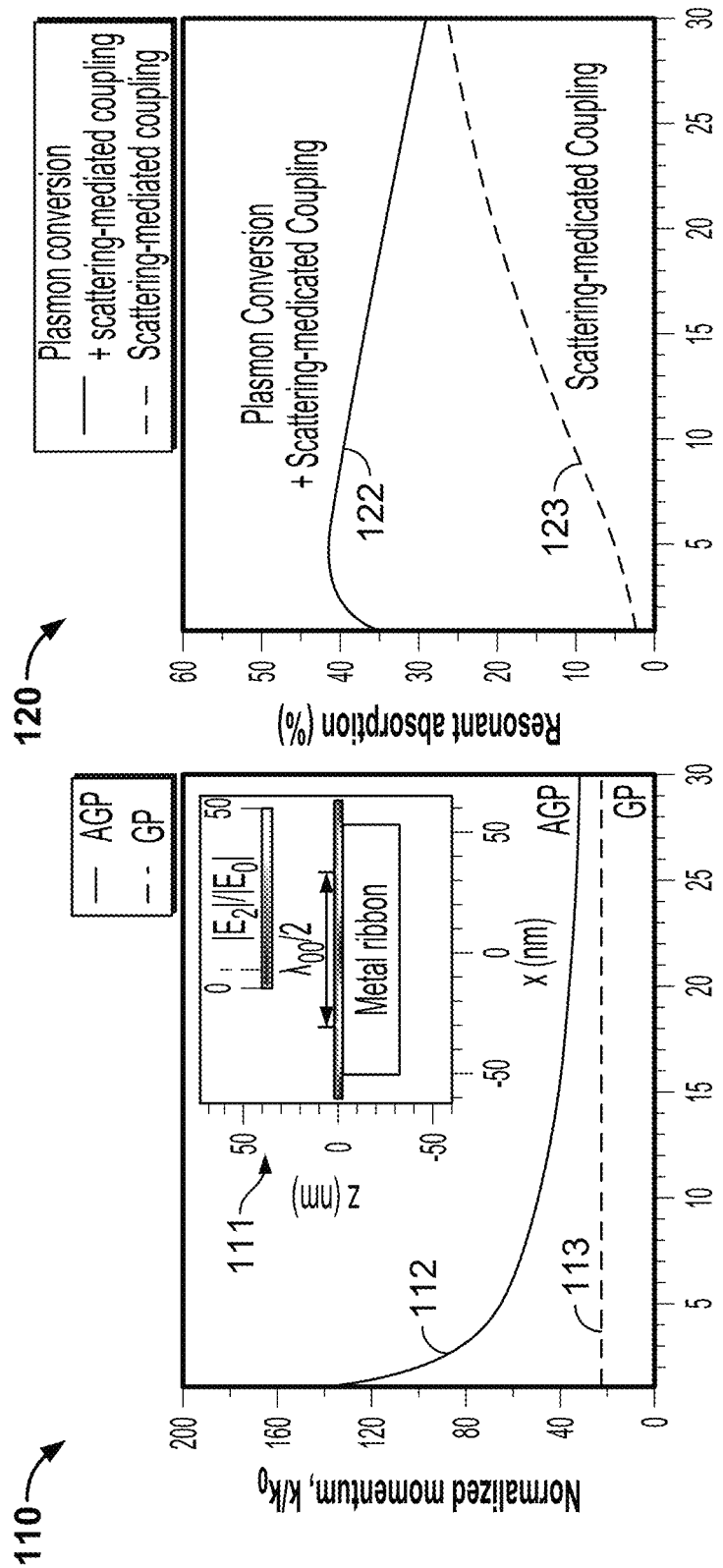

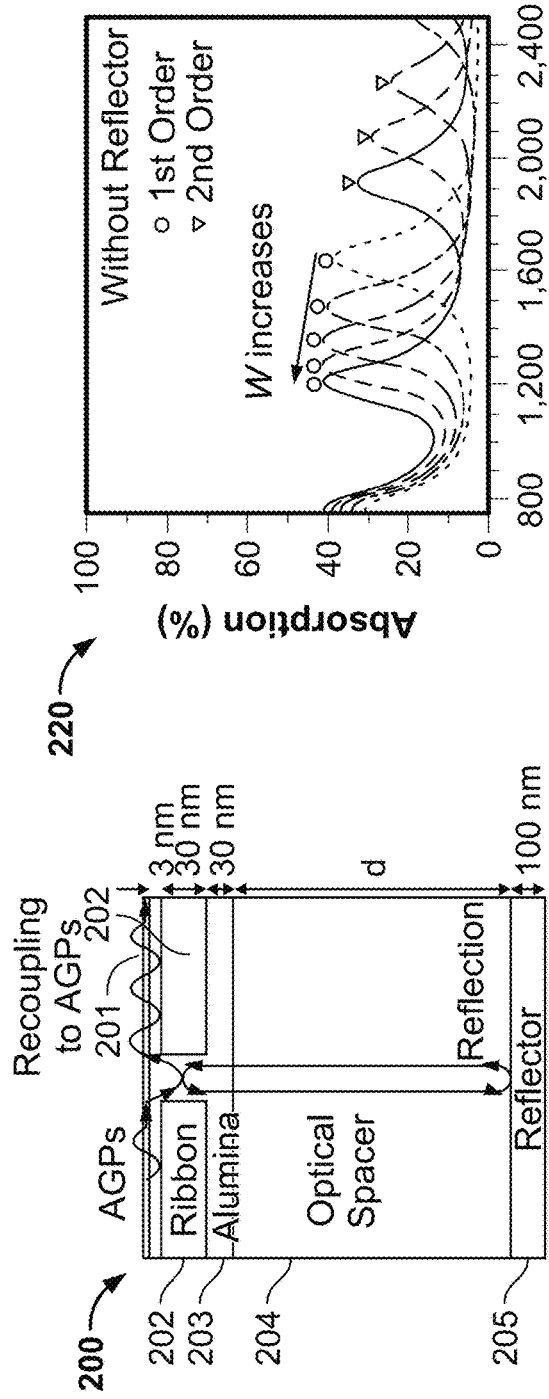
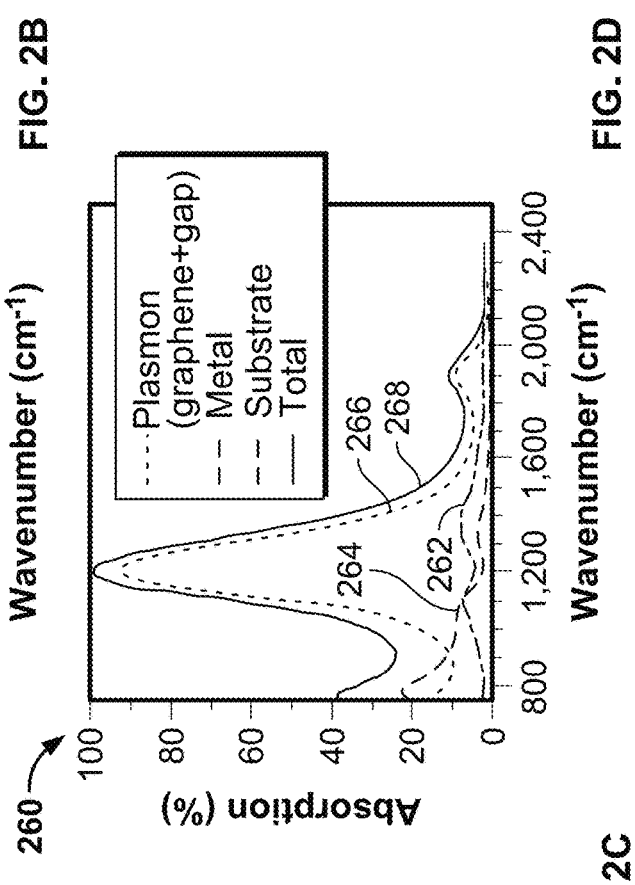
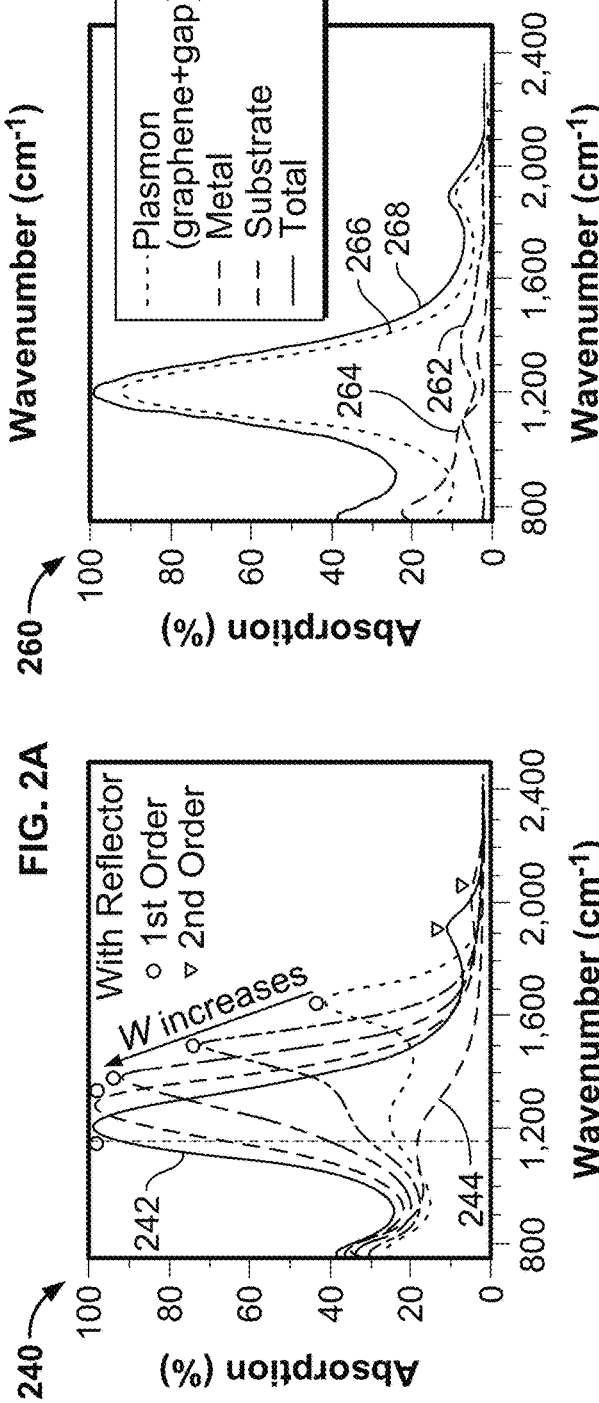
FIG. 2A
FIG. 2B
FIG. 2C
FIG. 2D

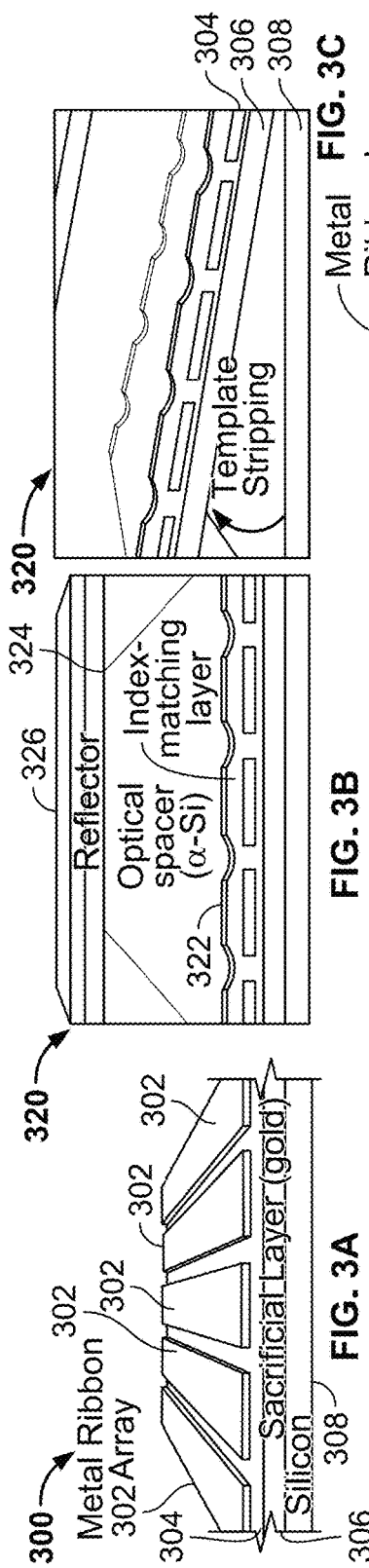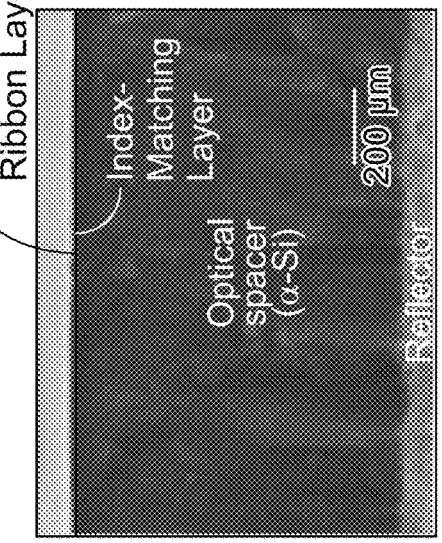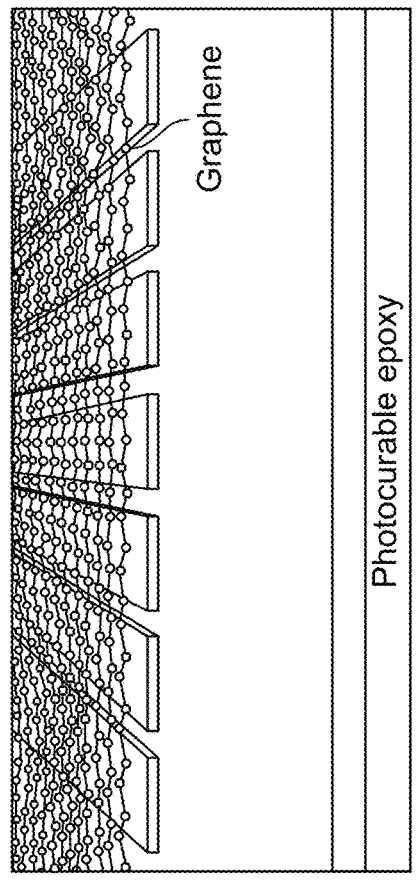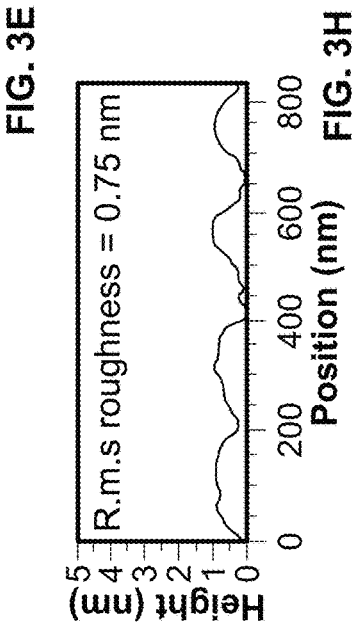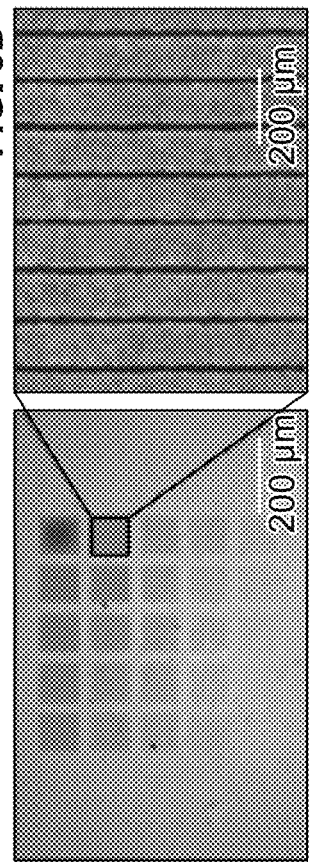

GRAPHENE PLASMON RESONATORS

CROSS REFERENCE TO RELATED APPLICATIONS

This application is a divisional of U.S. Utility application Ser. No. 16/894,314, filed Jun. 5, 2020, which claims the benefit of U.S. Provisional Application Ser. No. 62/857,434, filed Jun. 5, 2019. The disclosures of the prior applications are considered part of (and are incorporated by reference in) the disclosure of this application.

TECHNICAL FIELD

This instant specification relates to graphene plasmon resonators.

BACKGROUND

One of the fundamental hurdles in plasmonics is the trade-off between electromagnetic field confinement and the coupling efficiency with free-space light, a consequence of the large momentum mismatch between free-space light from the excitation source and plasmonic modes. Plasmons in graphene, in particular, have an extreme level of field confinement, as well as an extreme momentum mismatch.

SUMMARY

In general, this document describes graphene plasmon resonators with very high absorption of incident mid-infrared light.

In a general aspect, a graphene plasmon resonator includes a planar patterned layer having a collection of electrically conductive segments, and a collection of dielectric segments, each dielectric segment defined between a corresponding pair of the electrically conductive segments, a graphene layer substantially parallel to the planar patterned layer and overlapping the collection of electrically conductive segments, and a planar dielectric layer between the planar patterned layer and the graphene layer.

Various embodiments can include some, all, or none of the following features. The collection of electrically conductive segments and the collection of dielectric segments can be sized and spaced to establish a resonance frequency of the graphene plasmon resonator corresponding to a predetermined wavelength of electromagnetic radiation. The predetermined wavelength of electromagnetic radiation can be within an infrared spectrum of light. The graphene plasmon resonator can also include a planar reflector layer comprising a reflective material arranged substantially parallel to the planar patterned layer opposite the graphene layer and configured to reflect the predetermined wavelength of electromagnetic radiation, and a planar spacer layer, comprising a substantially electromagnetically transparent material arranged between the planar reflector layer and the planar patterned layer and configured to be substantially electromagnetically transparent to the predetermined wavelength of electromagnetic radiation. The planar reflector layer can be spaced apart from the planar patterned layer by a distance of about one-quarter wavelength of the predetermined wavelength of electromagnetic radiation. The graphene plasmon resonator can also include a planar refractive layer arranged between the planar patterned layer and the planar spacer layer, the planar refractive layer including a material having a refractive index that is greater than a refractive index of an ambient environment and less than a refractive index of the planar spacer layer. The planar dielectric layer, the plurality of dielectric segments, or both, can include alumina. The graphene plasmon resonator can also include a waveguide having a dielectric segment arranged substantially parallel to the graphene plasmon resonator, wherein the dielectric segment defines a major axis and is sized to support a waveguide mode that propagates along the major axis. The graphene plasmon resonator can be configured to couple incident far-field radiation to the waveguide mode. The waveguide can have a dominant waveguide mode, and a frequency of the dominant waveguide mode can be based on a resonance of the graphene plasmon resonator.

In another general aspect, a method of forming a graphene plasmon resonator includes providing a planar dielectric layer, forming a planar patterned layer upon a first side of the planar dielectric layer wherein the planar patterned layer comprises a collection of electrically conductive segments and a collection of dielectric segments, each dielectric segment defined between a corresponding pair of the electrically conductive segments, and applying a graphene layer upon the planar dielectric layer opposite the planar patterned layer.

Various implementations can include some, all, or none of the following features. The collection of electrically conductive segments and the collection of dielectric segments can be sized and spaced to define a resonance frequency corresponding to a predetermined wavelength of electromagnetic radiation. The predetermined wavelength of electromagnetic radiation can be within an infrared spectrum of light. Providing a planar dielectric layer can also include providing a substrate, forming a planar sacrificial layer on the substrate, and forming the planar dielectric layer on the planar sacrificial layer. The method can include separating the substrate from the planar dielectric layer and the planar patterned layer prior to applying the graphene layer. The method can also include, prior to applying the graphene layer, forming a spacer layer on the planar patterned layer, wherein the spacer layer is substantially electromagnetically transparent to the predetermined wavelength of electromagnetic radiation, and forming a reflector layer on the spacer layer, wherein the reflector layer comprises a material that reflects the predetermined wavelength of electromagnetic radiation. The spacer layer can have a thickness of about one-quarter wavelength of the predetermined wavelength of electromagnetic radiation. The method can also include, prior to forming the spacer layer, forming an anti-reflective layer on the planar patterned layer, wherein the anti-reflective layer has a refractive index that is greater than a refractive index of and ambient environment and less than a refractive index of the spacer layer, and wherein the spacer layer is formed on and in contact with a surface of the refractive index matching layer. The planar dielectric layer, the collection of dielectric segments, or both, include alumina.

In another general aspect, a method includes providing a graphene plasmon resonator having a planar patterned layer having a collection of electrically conductive segments, and a collection of dielectric segments, each dielectric segment defined between a corresponding pair of the electrically conductive segments, a graphene layer substantially parallel to the planar patterned layer and overlapping the collection of electrically conductive segments, and a planar dielectric layer between the planar patterned layer and the graphene layer, and at least one of (i) applying light to the graphene plasmon resonator, generating an electrical potential in the planar patterned layer based on the light, and measuring the generated electrical potential, (ii) applying light to the graphene plasmon resonator, applying an electrical bias to at least one of the planar patterned layer and the graphene layer, and modifying a trajectory of the light based on the electrical bias, and (iii) applying an electrical bias to at least one of the planar patterned layer and the graphene layer, and emitting light based on the electrical bias.

The systems and techniques described here may provide one or more of the following advantages. First, a system can couple incident infrared light to plasmons with high efficiency despite large momentum mismatch between them. Second, the system can enable high levels of light-matter interactions. Third, the resonance of the system can be tuned by various electrical, chemical, and optical doping techniques. Fourth, the system is compatible with high-throughput and scalable fabrication processes. Fifth, the system can be fabricated using a process that prevents damage on two-dimensional material layers during fabrication. Sixth, the system can be fabricated using a process that allows the use of continuous two-dimensional material layers. Seventh, the system can be fabricated upon topographically flat patterned substrates.

The details of one or more implementations are set forth in the accompanying drawings and the description below. Other features and advantages will be apparent from the description and drawings, and from the claims.

BRIEF DESCRIPTION OF THE DRAWINGS

FIG. 1B is a graph that shows an example of normalized momentum.

FIG. 1C, is a graph that shows an example of resonant absorption.

FIG. 2A is a schematic illustration of an example mechanism for plasmonic absorption enhancement.

FIG. 2B is a graph of example numerical results for absorption spectra from graphene plasmon resonators without an optical spacer and reflector.

FIG. 2C is a graph of example numerical results for absorption spectra from graphene plasmon resonators with an optical spacer and reflector.

FIG. 2D is graph of example absorption contributions from different parts of a resonator.

FIG. 3A shows an example pattern of gold ribbons.

FIG. 3B shows an example arrangement of sequentially deposited layers.

FIG. 3C shows an example of template stripping.

FIG. 3D is an example schematic view of a final device structure.

FIG. 3E shows an example cross-sectional image of the final device.

FIG. 3F shows an example optical micrograph of a top surface of an example resonator.

FIG. 3G shows an example image of ribbons.

FIG. 3H shows an example surface morphology of ribbons

DETAILED DESCRIPTION

Figure 1A:
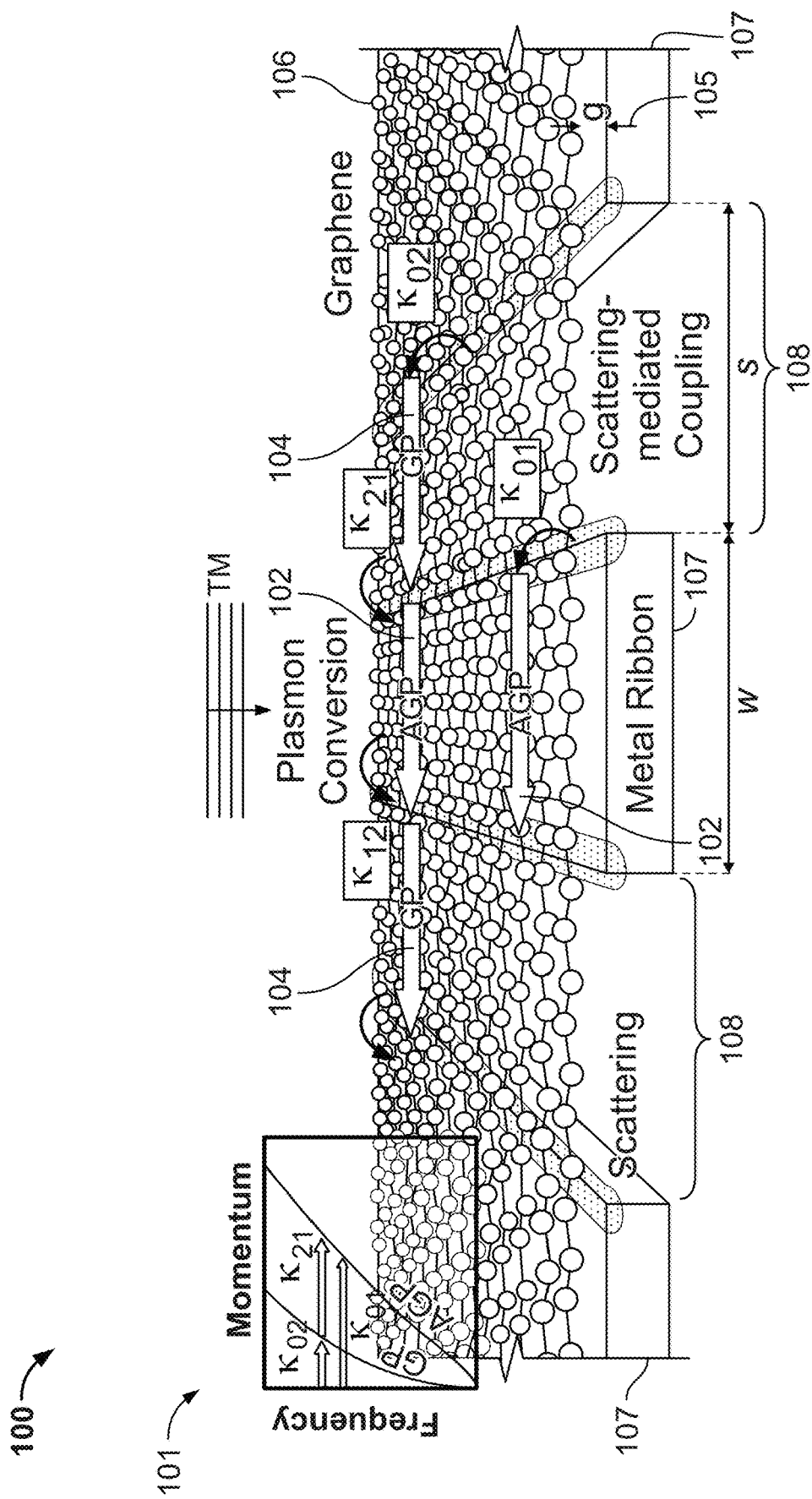
FIG. 1A shows an exemplary acoustic plasmon resonator architecture and coupling routes to plasmon modes.

This document describes graphene plasmon resonators with very high absorption (e.g., about 90%-94% or better) of incident infrared (e.g., mid-infrared) light. In general, this high efficiency is achieved by utilizing a two-stage coupling scheme: free-space light coupled to conventional graphene plasmons, which then coupled to ultra-confined plasmons (e.g., conventional plasmons, acoustic plasmons). To realize this scheme, unpatterned large-area graphene is transferred onto template-stripped ultra-flat metal ribbons. A monolithically integrated optical spacer and a reflector further boost the enhancement. Graphene plasmons allow ultrasensitive measurements of absorption bands and surface phonon modes in angstrom-thick protein and $SiO_2$ layers, respectively. The plasmon resonator platform is scalable and can harness the ultimate level of light-matter interactions for potential applications including spectroscopy, sensing, metasurfaces and optoelectronics.

Plasmons in graphene have been exploited for a wide range of applications, including optical modulators, photodetectors, metasurfaces, polarization control devices, and sensors. Due to the weak light-matter interactions in atomically thin graphene, the operation of these devices primarily relies on the deep sub-wavelength confinement of electromagnetic waves enabled by graphene plasmons (GPs). When graphene is placed in proximity to a metal surface, the charge oscillations within graphene are balanced by out-of-phase oscillations from image charges, generating graphene plasmons characterized by a linear dispersion at small wavevectors. Graphene plasmons can generate an ultra-confined out-of-plane electric field in the gap between the graphene and the metal. Recent observations of propagating graphene plasmons using near-field scanning optical microscopy showed extreme field confinement (around ×1,000) of free-space light at terahertz frequencies.

The tight confinement afforded by graphene plasmons is promising for a variety of applications, for example, surface-enhanced infrared absorption spectroscopy (SEIRA), but also implies a very large momentum mismatch with free-space light and hence poor coupling efficiency. For SEIRA applications, a highly efficient far-field coupling scheme is essential to the weak vibrational fingerprints of thin-film analytes from back-ground noise. Recently, graphene plasmons were used to demonstrate the ultimate limits of field confinement, but the extinction signal in the mid-infrared was relatively weak, which presents a challenge for SEIRA applications.

In this document, a strategy is described for achieving graphene plasmon resonators with dramatically improved plasmon resonances (measured absorption of about 90%-94%) by utilizing conventional graphene plasmons as an intermediary and by monolithically integrating an optical spacer and a back reflector. The large absorption enabled by the graphene plasmon resonator, in turn, allows, for example, ultrasensitive detection of mid-infrared absorption bands from sub-monolayer protein films and plasmon-phonon coupling from angstrom-thick $SiO_2$ layers using far-field Fourier-transform infrared measurements.

FIG. 1A shows a schematic illustration of a plasmon resonator architecture 100 and coupling routes to plasmon modes for a plane wave normally incident with transverse magnetic (TM) polarization. Arrows 102 represent acoustic graphene plasmons (AGPs) and arrows 104 represent conventional graphene plasmons (GPS). $\kappa_{ij}$ denotes the coupling coefficient from the i to j mode where $i,j \in \{0, 1, 2\}$ represent free-space waves, AGPs and GPs, respectively, and a gap distance g, represented by arrows 105, between a graphene layer 106 and an array of conductive (e.g., metal) ribbons 107, each having a width w. An inset graph 101 shows an example of plasmon dispersions for AGPs and GPs in the free-standing case. In the illustrated example, neighboring ones of the conductive ribbons 107 are separated by a collection of spacers 108 having a width s. FIG. 1B is a graph 110 that shows an example of gap dependence of AGP plasmon momentum k normalized to the free-space momentum $k_0$ at the free-space wavelength of 8 µm. An inset 111 shows an example of near-field distribution for the AGP resonator for g=3 nm (e.g., freestanding case). FIG. 1C, is a graph 120 that shows an example of resonant absorption as a function of gap size for the scattering-mediated coupling scheme and the plasmon conversion scheme at the free-space wavelength of 8 µm. In the examples of FIGS. 1B and 1C, the gap 105 is filled with alumina or any other appropriate dielectric or electrical insulator.

The graphene resonator 100 includes the graphene layer 106, formed as a continuous graphene layer, and the array of conductive ribbons 107 separated by the gap (g) 105 (see FIG. 1A). In some embodiments, the conductive ribbons 107 can be any appropriate electrically-conductive material, such as strips of metal (e.g., gold) or graphene. In the illustrated examples and in the descriptions to follow, the array of conductive ribbons 107 is illustrated and described as a metal ribbon array. The width of each conductive ribbon 107 and the spacing between adjacent conductive ribbons 107 are denoted by w and s, respectively, and the periodicity is given by p=w+s. The unit cell of the graphene plasmon resonator 100 includes two sections, with and without the metal underneath the graphene layer 106. The metal-coupled region supports acoustic graphene plasmons and the metal-free region supports conventional graphene plasmons. Due to the presence of graphene layer 106, formed as a continuous graphene layer, AGPs can be launched not only through scattering-mediated coupling ($\kappa_{01}$) but also through the plasmon conversion process from GPs with smaller momenta ($\kappa_{21}$), which can be more efficiently excited from the scattered fields ($\kappa_{02}$). Here, $\kappa_{ij}$ denotes the coupling coefficient from the i to j mode, where $i,j \in \{0, 1, 2\}$ represent the free-space wave, AGP and GP modes, respectively. For a normally incident plane wave with transverse magnetic (TM) polarization, the electric field enhancement of the plasmons in the graphene plasmon resonator architecture 100 can be approximated as follows:

$$\frac{E_p}{E_{inc}} \approx \begin{cases} (K_{01} + K_{02}K_{21}e_2)(1 - K_{12}K_{21}e_1e_2)^{-1}, & 0 < x < w \\ (K_{02} + K_{01}K_{12}1)(1 - K_{12}K_{21}e_1e_2)^{-1}, & -s < x < 0 \end{cases} \quad \text{[EQUATION 1]}$$

where $e_1 = \exp(ik_1w)$ and $e_2 = \exp(ik_2S)$. $E_{inc}$ and $E_p$ are the x components of the electric field magnitudes for the incident waves and the plasmons propagating in the x direction, respectively. From equation (1), the resonance condition is given as $$k_1w + k_2s + \varphi_{12} + \varphi_{21} = 2l\pi \quad \text{[EQUATION 2]}$$

where $k_1$ and $k_2$ denote the momentum of the AGPs and GPs, respectively, and/is an integer that represents the order of the resonance. $\phi_{12}$ and $\phi_{21}$ are the phases of $\kappa_{12}$ and $\kappa_{21}$, respectively, which are close to zero. Similarly, the reflection amplitude across the metal-coupled and metal-free interfaces can also be neglected in this simple model because the maxi-mum reflectance only approaches 30% for the parameters relevant in our experiments. The small reflectance in our scheme contrasts with the case of GPs reflected by the physical edge of graphene, where the reflectance approaches almost 100% with a non-trivial reflection phase of approximately $-0.75\pi$. The numerators in equation (1) imply that the contributions from plasmon conversions ($\kappa_{02}\kappa_{21}e_2$ and $\kappa_{01}\kappa_{12}e_1$) boost the plasmon enhancement on top of the scattering-mediated coupling. In some embodiments, due to the extreme vertical confinement of both acoustic and conventional graphene plasmons, the plasmon conversion process ($\kappa_{12}$ and $\kappa_{21}$) can be highly efficient. In addition, $\kappa_{02}$ is larger than $\kappa_{01}$ due to the smaller momentum mismatch between graphene plasmons and scattered fields as well as the better mode overlap between them. Thus, the overall coupling coefficient for acoustic GPs is largely determined by $\kappa_{02}\kappa_{21}e_2$ for small $k_2s$. Analytical calculations (e.g., FIG. 1B) show that the momentum of an acoustic graphene plasmon mode (represented by line 112) increases with decreasing g at a given frequency compared with the momentum of a conventional plasmon mode (represented by line 113). As illustrated in FIG. 1C, the present design retains high resonant absorption irrespective of g, thereby substantially or completely eliminating the trade-off with the momentum mismatch between acoustic graphene plasmons and free-space waves (represented by line 122). In some embodiments, the resonator can be designed with graphene ribbons on metal ribbons, which relies on the scattering-mediated coupling process (represented by line 123).

FIG. 2A is a schematic illustration of an example architecture 200 for plasmonic absorption enhancement using the quarter-wavelength condition. The architecture 200 includes a graphene layer 201, an array of conductive ribbons 202, a dielectric spacer 203, an optical spacer layer 204 made of a substantially electromagnetically transparent material, and a reflector layer 205 (e.g., a planar refractive layer, a planar reflective layer). In the illustrated example, $v_c = (4n_sd)^{-1}$, where $v_c$ and $n_s$ are the critical wavenumber that satisfies the quarter-wavelength condition and the refractive index of the optical spacer layer 204, respectively. FIGS. 2B and 2C show graphs 220 and 240, respectively, of example numerical results for absorption spectra from GP resonators without (e.g., FIG. 2B) and with (e.g., FIG. 2C) an optical spacer and reflector such as the optical spacer layer 204 and the reflector layer 205. FIG. 2D shows a graph 260 of example absorption contributions from the different parts of the resonator with w=85 nm. A line 262 represents the absorption of electromagnetic fields by plasmons in the conductors. A line 264 represents the absorption of electromagnetic fields by plasmons in the substrate. A line 266 represents the absorption of electromagnetic fields by plasmons in the graphene layer and gap regions. A line 268 represents the total absorption of electromagnetic fields. In the illustrated examples, alumina is used as a gap-filling material with a gap size of 3 nm, s is fixed to be 20 nm, and w varies from 45 nm to 85 nm in intervals of 10 nm. In FIGS. 2C and 2D, $n_s$=3.3 and d=580 nm. The absorption contributions are calculated from the power dissipation by integrating $$\frac{1}{2P_0}\omega\varepsilon_0\Im(\varepsilon_r)|E|^2$$

over the region of interest, where ω, $\varepsilon_0$, ($\varepsilon_r$), and $P_0$ are angular frequency, vacuum permittivity, the imaginary part of relative permittivity, and incident power per unit length, respectively. Because graphene plasmons store most of their electromagnetic fields in the graphene and gap regions, the plasmonic contribution to the resonant absorption is the sum of the power dissipation in both parts (line 266).

In addition to the plasmon conversion process, the resonant absorption of the graphene plasmon resonator can be further boosted by placing a reflector at a certain distance below the metal ribbons to recouple the transmitted waves back to the plasmon modes (e.g., as shown in the example architecture 200 of FIG. 2A). Similar approaches have been employed to enhance the resonant absorption in graphene ribbon resonators. In some examples, the absorption enhancement by recoupling can be substantial due to large transmittance through the array of metal ribbons for transverse magnetic (TM) polarization. The resonant absorption is increased when the plasmon resonance is aligned to the critical wavelength $\lambda_c$ that satisfies the 'quarter-wavelength condition'. At this condition, the total phase retardation of an electromagnetic wave after a round trip inside an optical spacer becomes π, hence substantially maximizing the electric field at the resonator. In some embodiments, the thickness of an optical spacer (refractive index $n_s$) for the quarter-wavelength condition can be d=$\lambda_c$*(4 $n_s$) or, equivalently, d=1/(4$n_s v_c$) using the critical wavenumber $v_c$.

The effect of adding the reflector layer 205 and the optical spacer layer 204 is illustrated in FIGS. 2B and 2C. Without a reflector (e.g., FIG. 2B), the resonant absorption intensities calculated for free-standing devices with different w are around 40%. With a reflector (e.g., FIG. 2C), on the other hand, the resonant absorption increases by a factor of more than two and becomes nearly 100% when the plasmon resonance approaches $v_c$=1,150 cm$^{-1}$ (represented by line 242). The resonance wavelengths do not shift in the presence of a reflector, indicating that the coupling mechanism in the resonator part does not interfere with the absorption enhancement by the quarter-wavelength condition. Note that, even without graphene, the enhanced absorption in the substrate and metal parts manifests as a peak in the absorption spectrum around $v_c$ (represented by line 244). Thus, it is important to investigate how the power dissipation through the substrate and metal parts competes with the dissipation via plasmons in the presence of graphene. As shown in FIG. 2D, the absorption in the substrate (line 264) and conductive parts (line 264) is greatly suppressed in the presence of graphene and the plasmonic absorption becomes a dominant contributor (e.g., approximately 90%-94% of the total resonant absorption). This result shows that, even after integration with an optical spacer and reflector, the optical response of the entire system is dominated by the monolayer graphene and nano-gap region near the top surface.

FIG. 3A shows an example pattern 300 of gold ribbons 302 via electron-beam lithography on top of an alumina layer 304 and a sacrificial layer 306 (e.g., gold or any other appropriate material) deposited on a silicon substrate 308. FIG. 3B shows an example arrangement 320 of sequentially deposited alumina, amorphous silicon, and gold films as an index-matching layer 322, optical spacer 324, and back reflector 326, respectively. FIG. 3C shows an example of template stripping of the arrangement 320 to expose an ultra-flat interface between the alumina layer 304 and the sacrificial layer 306 using photo-curable epoxy as a backing layer. FIG. 3D is an example schematic view of the final device structure. FIG. 3E shows an example cross-sectional scanning electron microscope (SEM) image of the final device. FIG. 3F shows an example optical micrograph of the top surface of the resonator with an array of metal ribbons with different periodicities. FIG. 3G shows an example SEM image of ribbons. In the illustrated example, the ribbons have 180 nm width, 20 nm spacing, and 20 nm gap size. FIG. 3H shows an example surface morphology of ribbons taken by atomic force microscopy (AFM).

The main fabrication challenge in implementing our plasmon resonator is producing an ultra-flat substrate in the presence of the uneven topography resulting from the underlying metal ribbons. In some examples, numerical results have shown that such unevenness or surface roughness can significantly attenuate far-field signals. For sensing applications, a graphene layer can be exposed at the top of the device to enable interaction between the plasmons and the target materials. In some implementations, these challenges can be overcome by using a technique known as template stripping, which allows the high-throughput fabrication of ultra-smooth patterned metals by replicating them via a reusable silicon template. The detailed fabrication process based on template stripping is illustrated in FIGS. 3A-3C. As shown in the final device structure in FIG. 3D, this fabrication process also allows the monolithic integration of an optical spacer and a reflector that can enhance plasmonic signals via the quarter-wavelength condition.

The cross-sectional scanning electron microscopy (SEM) image in FIG. 3E shows that functional layers are well defined after the fabrication process. The optical micrograph of the final device in FIG. 3F shows that the top surface and underlying patterns are free from damage after template stripping. The SEM image taken for p=200 nm shows typical metal ribbons. In this example, the length of each ribbon along its long axis is 100 μm, which is about ten times larger than the operating wavelengths and permits the plasmonic responses of the resonator to be described in the two-dimensional (2D) framework. Also, s is designated to be as small as possible in order for the contribution of acoustic GPs to be dominant over that of GPs and maximize resonant absorption by increasing the plasmon conversion contribution. Despite the presence of the ribbon patterns, the root-mean-square (RMS) roughness of the template-stripped resonator surface measured by atomic force microscopy (AFM) is about 0.75 nm.

Figure 4A:
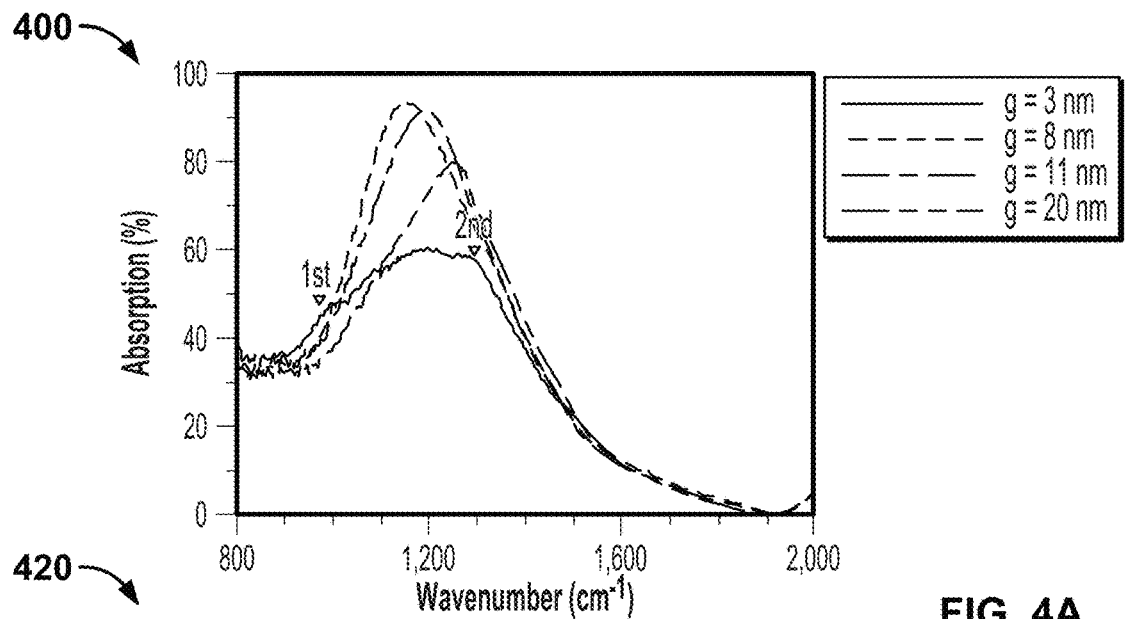
FIG. 4A is a graph of example plasmon absorption spectra.
Figure 4B:
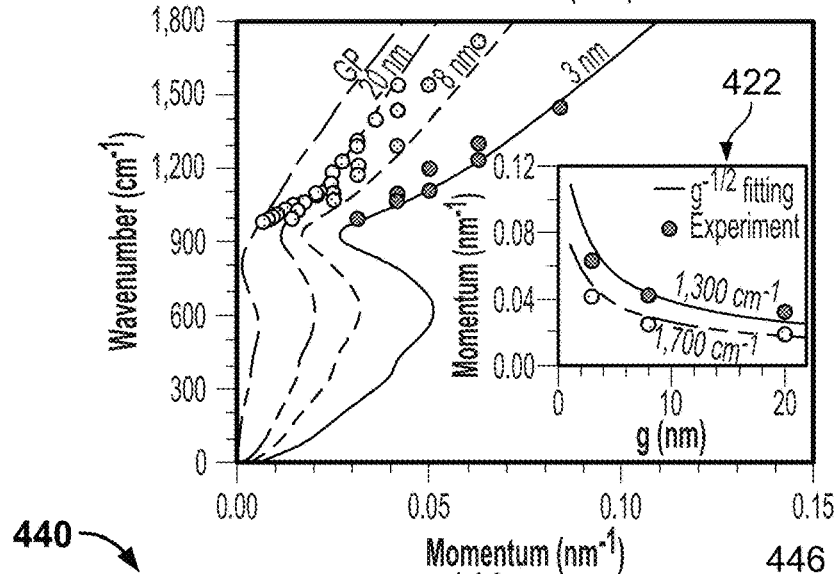
FIG. 4B is a graph of example gap-size-dependent plasmon dispersion.
Figure 4C:
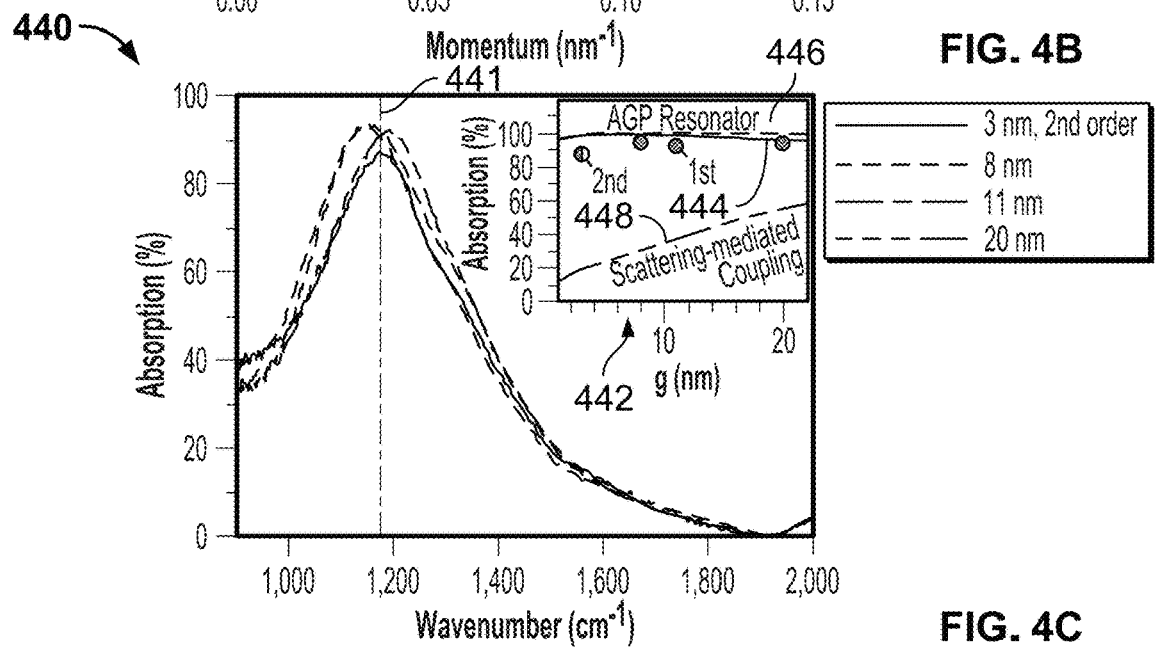
FIG. 4C is a graph of examples absorption spectra.

FIG. 4A is a graph 400 of example plasmon absorption spectra for g=3, 8, 11, and 20 nm with w=180 nm and s=20 nm. FIG. 4B is a graph 420 of example gap-size-dependent plasmon dispersion. An inset 422 shows an example relationship of momentum on g at resonant frequencies of 1,070 and 1,300 cm$^{-1}$, in which solid lines represent the square root fitting of the experimental results (circles). FIG. 4C is a graph 440 of examples absorption spectra for different g where resonance frequencies are almost aligned around the critical wavenumber ($v_c$) of 1,170 cm$^{-1}$. w=230, 180, 180, and 230 nm with s=20 nm for g=3, 8, 11, and 20 nm, respectively. An inset 442 shows a graph of example resonant absorption as a function of g along with the numerical results for the plasmon conversion scheme, in which a line 444 represents the first order of resonance and a line 446 represents the second order of resonance, and the scattering mediated scheme (represented by line 448).

The graph 400 of FIG. 4A shows the example absorption spectra for different values of g ranging from 3 nm to 20 nm for w=180 nm. As shown in the illustrated example, the resonance shifts to longer wavelengths with decreasing g as the plasmon momentum increases at a given frequency. As the plasmon resonance approaches $v_c$, the resonant absorption increases, consistent with the numerical results graphed in FIG. 2C. From the absorption spectra for different w, we extract the plasmon dispersions using the relation $k_1 \approx 2\pi/(w+s)$, which is valid for $k_2 s \ll 1$. The plasmon momenta estimated from the absorption spectra increase with decreasing g and agree well with the analytical dispersions (e.g., FIG. 4B). The inset 422 in FIG. 4B shows that the plasmon momentum scales as $g^{-1/2}$ at a given frequency, as predicted by theory. In our experimental regime, we observe a normalized momentum $k_1/k_0$ of up to 91 for the g=3 nm case at a frequency of 1,450 cm$^{-1}$, which is three times larger than that of graphene plasmons. The dispersion converges asymptotically to the phonon energy at small momentum, due to coupling with the surface phonons of alumina that occurs around 900 cm$^{-1}$. Theoretical analysis implies that stronger interactions with the phonons can occur as the plasmon confinement becomes tighter.

The graph 440 of FIG. 4C shows an example comparison of absorption spectra from GP resonators with different g but almost identical resonance frequencies near 1,170 cm$^{-1}$. In all cases we observe nearly perfect absorption (e.g., up to 94% for the 8 nm case, represented by line 441) of incoming waves polarized perpendicular to the long axis of the metal ribbons. In addition to such a strong resonant absorption, we anticipate that the light-matter interaction by graphene plasmons can be further enhanced by reducing the damping of plasmons using higher quality graphene, encapsulating graphene with hexagonal boron nitride or using multilayer graphene. In contrast to a scattering-mediated coupling scheme, the measured resonant absorption for the graphene plasmon resonator is nearly constant in g because the coupling efficiency is largely determined by the plasmon conversion process. The quality factors for the plasmon resonances for different values of g range from 4.4 (g=8 nm) to 5.3 (g=3 nm), showing a weak dependence on plasmon confinement.

Figure 5A:
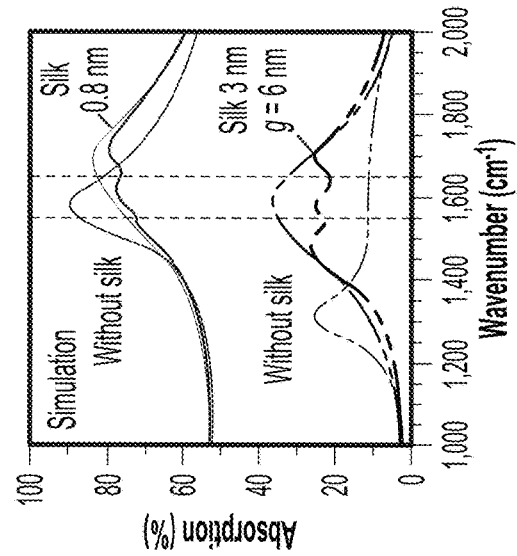
FIG. 5A shows a graph of example reference absorption spectra.
Figure 5B:
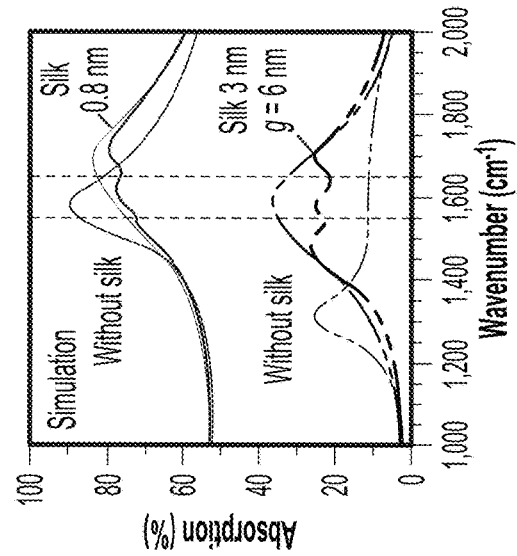
FIG. 5B is a graph of example measured absorption spectra from GP resonators.
Figure 5C:
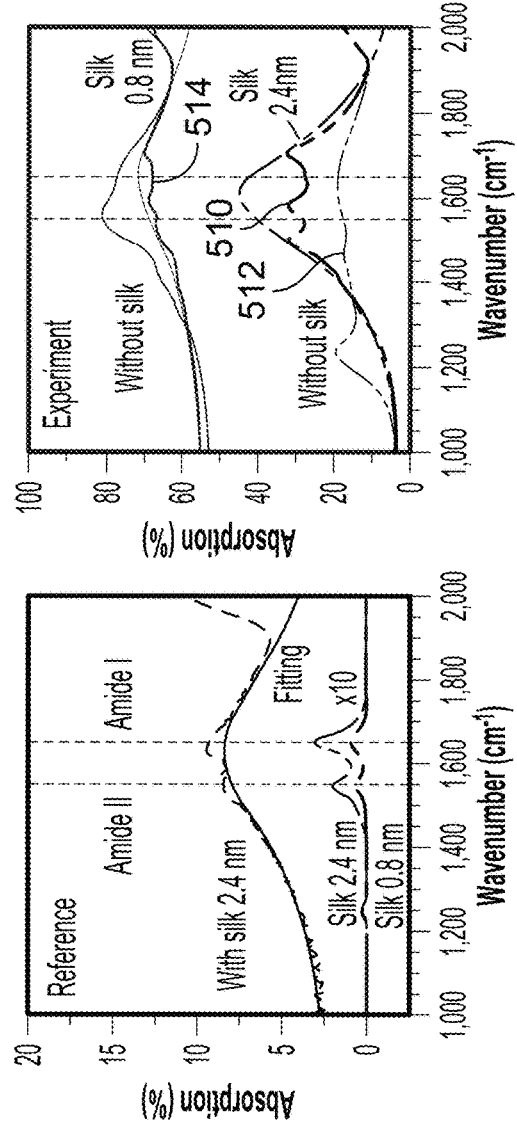
FIG. 5C is a graph of example numerically calculated absorption spectra.
Figure 5D:
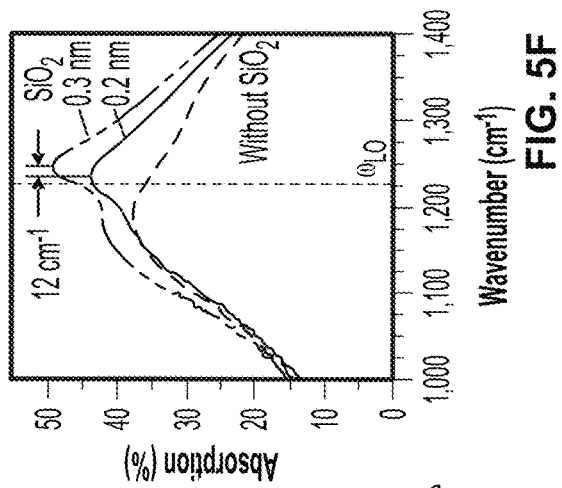
FIG. 5D is a graph of example reference absorption spectra for a free-standing $SiO_2$ film.
Figure 5E:
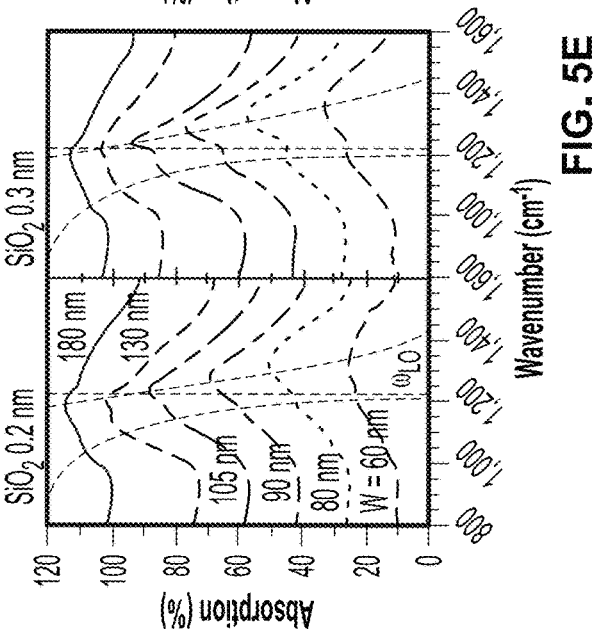
FIG. 5E is a graph of example measured absorption spectra from GP resonators.
Figure 5F:
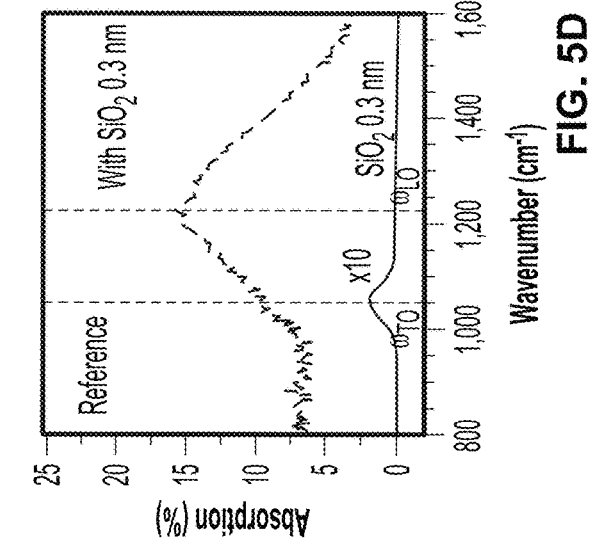
FIG. 5F is a graph of example measured absorption spectra for different $SiO_2$ thicknesses.

The sensing results for silk protein are shown in FIGS. 5A-5C. FIG. 5A shows a graph of example reference absorption spectra for free-standing silk films (e.g., 0.8 nm and 2.4 nm; numerical results, scaled ×10 for visibility), and a 2.4-nm-thick silk film on a template-stripped substrate without graphene. FIG. 5B is a graph of example measured absorption spectra from GP resonators coated with 0.8 nm and 2.4 nm silk films as well as the case without a silk film, and Lorentzian fitting curves (e.g., shown as dashed lines). In the illustrated example, w=60 nm and s=30 nm for the 0.8 nm case and w=90 nm and s=30 nm for the 2.4 nm case. FIG. 5C is a graph of example numerically calculated absorption spectra for comparison with the experimental results in FIG. 5B. In FIGS. 5B and 5C, the 0.8 nm case is shifted upwards. FIG. 5D is a graph of example reference absorption spectra for a free-standing 0.3 nm SiO$_2$ film (e.g., numerical results, lower curve) and the same film on a template-stripped substrate without graphene (e.g., measured data, upper curve). The longitudinal and transverse optical phonon frequencies of SiO$_2$, $\omega_{LO}$ and $\omega_{TO}$, are denoted by dashed lines. FIG. 5E is a graph of example measured absorption spectra from graphene plasmon resonators with 0.2 nm and 0.3 nm SiO$_2$ films for different w. FIG. 5F is a graph of example measured absorption spectra for different SiO$_2$ thicknesses for w=105 nm. In FIGS. 5a and 5b, d=450 nm; in FIGS. 5d-5f, d=630 nm.

In the illustrated examples, an unpolarized light source is used for better signal-to-noise ratios. To access the highly confined electric fields of graphene plasmons, the target films were deposited on a 5 nm thick alumina film on top of metal ribbons before transferring a graphene sheet. A 5 nm thick alumina film helps to retain a large plasmon signal by reducing the scattering of graphene plasmons from the surface roughness of a target film and also allows a fair comparison of spectra between the cases with and without a target film. In this example, the substrate for the graphene plasmon resonator is used before transferring graphene as a control sample, which has a peak in its absorption spectrum at $v_c$=1,600 cm$^{-1}$.

The absorption spectrum from the control sample spin-coated with a 2.4-nm-thick silk film in FIG. 5A shows only weak absorption signals (<1%) around the amide I and II bands at 1,650 and 1,546 cm$^{-1}$, respectively. In graphene plasmon resonators, the vibrational signals for the identical bands are an order of magnitude larger (13.2% and 11.6%) and clearly resolved with high signal-to-noise ratios (FIG. 5B, represented by line 510). Compared with the control device (e.g., without a target film inside the gap; represented by line 512), the plasmon resonance shifts to a shorter wavelength in the presence of a silk film. This is largely due to the increase in the gap size and resultant decrease in plasmon confinement. The increase in the effective index of the gap is minimal because of the small index difference between silk and alumina ($|n_{silk}-n_{alumina}|<0.2$) at the frequencies of interest. The inverted stack order and the 'graphene-last' transfer scheme reduce unwanted damage to analyte molecules. Although target molecules/films were inserted in the nano-gap between graphene and metal during the fabrication process in these proof-of-concept experiments, in some implementations, future developments of bio-sensing with graphene plasmon-based SEIRA can implement other sample insertion schemes.

Absorption for the amide I band is substantially larger than that reported for other configurations (for example, 3.5% for nanorod antennas with a 2 nm silk monolayer and 0.7% for graphene ribbons with an 8 nm protein film). Such strong light-matter interactions allow for the detection of sub-monolayer silk films. Because most of the coupled light is confined within the gap as an graphene plasmon, the mode overlap with a 0.8-nm-thick film ($\sim\lambda_{freespace}/7,500$) is still on the order of 10%, which translates into a significant absorption signal as high as 3.6% for the amide I band (represented by line 514 in FIG. 5B). The experimentally observed absorption signals for silk films are similar to the estimated values from the numerically fitted spectra shown in FIG. 5C. In some implementations, sensitivity can be further enhanced by decreasing the thickness of the alumina film inside the gap.

The phonon-plasmon coupling results for an angstrom-scale SiO$_2$ layer are shown in FIG. 5D-5F. While the control sample shows no distinct features (e.g., FIG. 5D), a splitting of the plasmon resonance is observed in the absorption spectra taken from graphene plasmon resonators with a 2 Å and 3 Å SiO$_2$ film (e.g., FIG. 5E). The 3 Å case shows a larger splitting of 102 cm$^{-1}$ compared to 92 cm$^{-1}$ for the 2

Å case, and a more distinct anti-crossing behavior. In some implementations, the mode splitting behavior can be attributed to the coupling with longitudinal optical phonons. The substantial resonance shift of 12 cm$^{-1}$ (78 nm in wavelength) between the 2 Å and 3 Å cases illustrates the angstrom-scale resolving power of our graphene plasmon-based sensing platform (e.g., FIG. 5F).

In some implementations, by harnessing an efficient plasmon conversion process in a continuous graphene layer coupled with metal ribbons, graphene plasmon resonators can overcome the fundamental tradeoff between field confinement and coupling efficiency. Some design examples can be realized as a scalable device platform via template stripping, which enables the monolithic integration of ultra-flat metal ribbons with an optical spacer and a backside reflector. A substantially pristine graphene layer is transferred last in our scheme, thereby reducing or eliminating intrusive graphene ribbon patterning steps and minimizing other process-induced damages. This feature is also highly desirable for integrating other 2D materials that cannot withstand harsh processing conditions. Experimentally, 94% absorption of incident mid-infrared light has been observed. By inserting analyte films into the plasmonic hotspots of graphene plasmon resonators, the light-matter interactions are increased and ultrasensitive detection of angstrom-thick protein and dielectric films are performed. The ability to generate ultra-confined and ultra-strong fields in a large-area chip, in addition to allowing high signal-to-noise-ratio far-field detection, can benefit fundamental studies of general polariton physics in other 2D materials and their heterostructures as well as nonlinear effects. This ability could also have strong impact on applications involving photodetectors, metasurfaces, light-emitting devices, rectification devices (e.g., rectenna), and optical modulators.

Figure 6A:
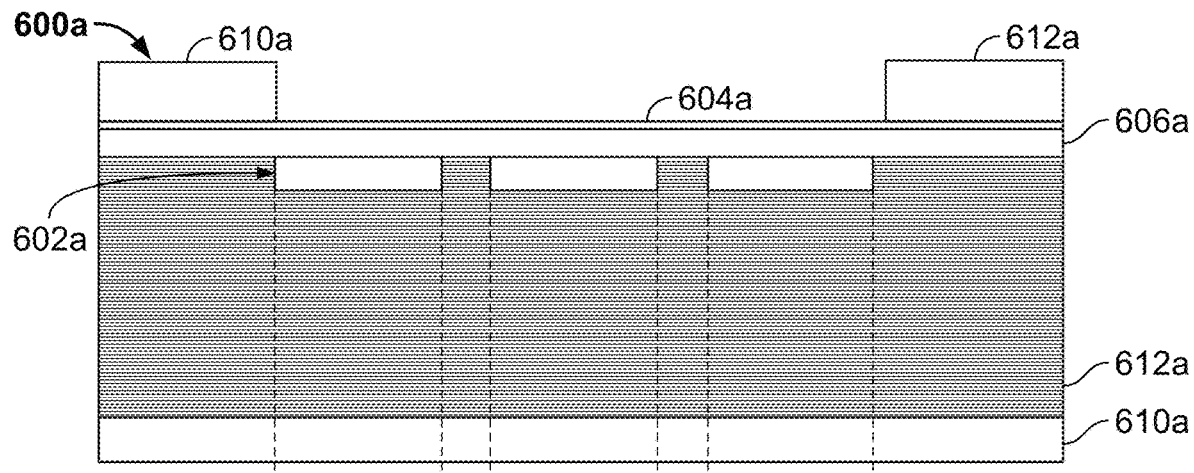
FIGS. 6A-6C show other examples of plasmon resonator architectures.

FIG. 6A shows another example of a plasmon resonator 600a. The plasmon resonator 600a includes a planar patterned layer 602a and a graphene layer 604a separated by a dielectric layer 606a. The planar patterned layer 602a includes a collection of conductive segments 608a separated by dielectric segments 609a. One or more of the conductive segments 608a is configured to be electrically biased. In some implementations, biasing the conductive segments 608a relative to the graphene layer 604a, the charge carrier concentration in the graphene can be controllably changed. The plasmon resonator 600a also includes an electrode 610a in electrical contact with the graphene layer 604a and includes an electrode 612a in electrical contact with the graphene layer 604a. The dielectric segments 609a define a major axis and are sized to support a waveguide mode that propagates along the major axis.

Figure 6B:
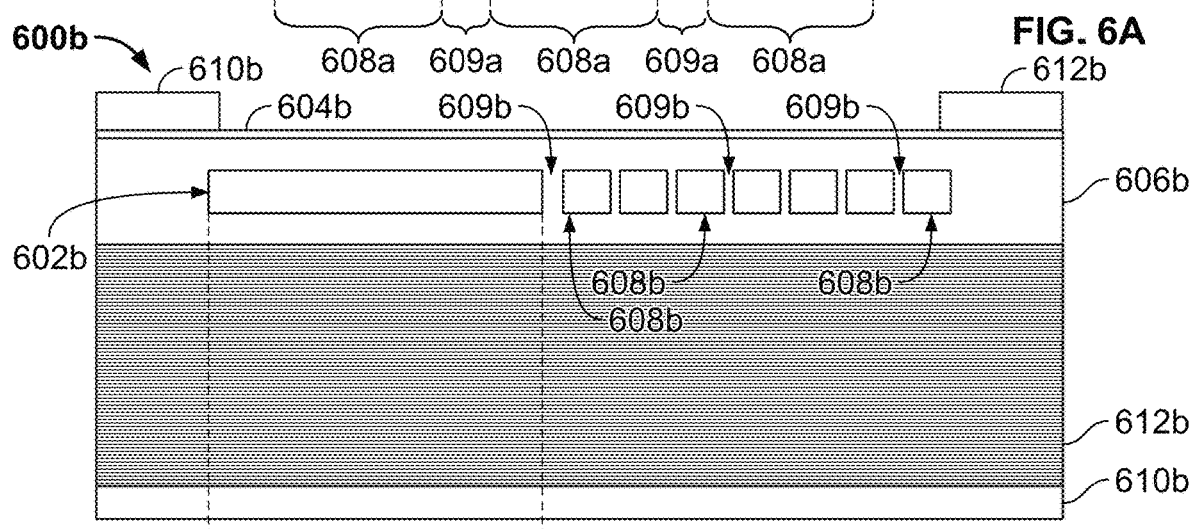

FIG. 6B shows another example of a plasmon resonator 600b. The acoustic plasmon resonator 600b includes a patterned layer 602b and a graphene layer 604b separated by a dielectric layer 606b. The patterned layer 602b includes a collection of asymmetric conductive segments 608b separated by dielectric segments 609b. One or more of the conductive segments 608b is configured to be electrically biased. In some implementations, biasing the conductive segments 608b relative to the graphene layer 604b, the charge carrier concentration in the graphene can be controllably changed. The acoustic plasmon resonator 600b also includes an electrode 610b in electrical contact with the graphene layer 604b and includes an electrode 612b in electrical contact with the graphene layer 604b.

Figure 6C:
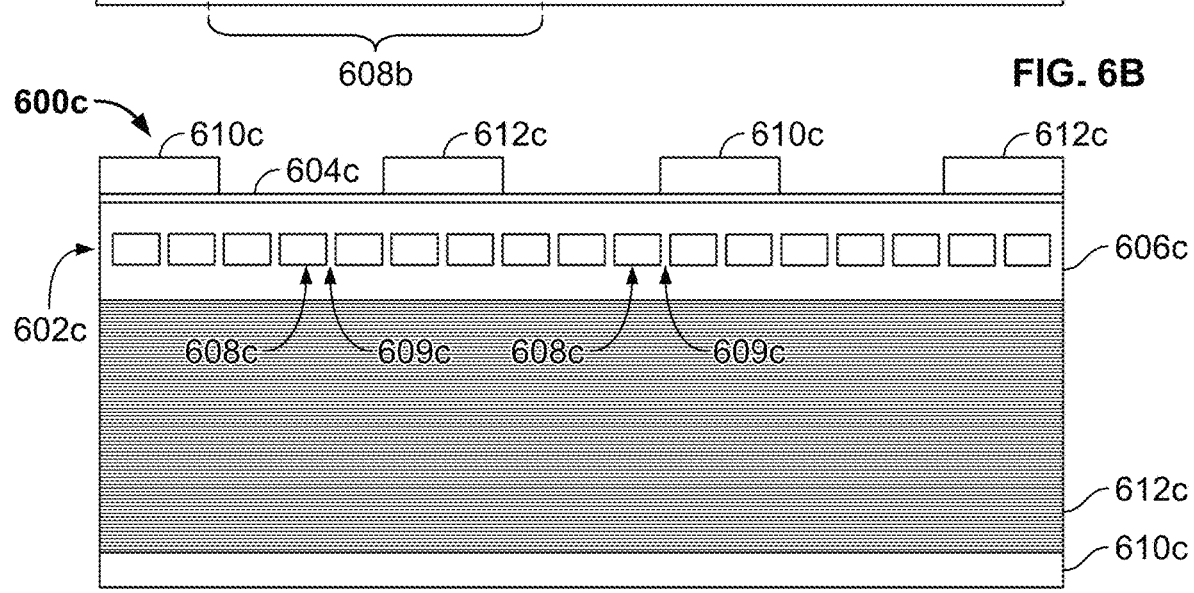

FIG. 6C shows another example of a plasmon resonator 600c. The plasmon resonator 600c includes a patterned layer 602c and a graphene layer 604c separated by a dielectric layer 606c. The patterned layer 602c includes a collection of conductive segments 608c separated by dielectric segments 609c. One or more of the conductive segments 608c is configured to be electrically biased. In some implementations, biasing the conductive segments 608c relative to the graphene layer 604c, the charge carrier concentration in the graphene can be controllably changed. The plasmon resonator 600c also includes a collection of electrodes 610c in electrical contact with the graphene layer 604c and includes a collection of electrodes 612c in electrical contact with the graphene layer 604c.

In use, the example plasmon resonators 600a-600c can be configured and operated in various modes. In some implementations, the plasmon resonators 600a-600c can be operated as sensors. For example, the plasmon resonator 600a can be exposed to light, and an electrical potential can be detected between predetermined combinations of one or more conductive segments 608a of the patterned layer 602a, the electrode 610a, and the electrode 612a. This electrical potential can change based on the presence of other materials in contact with the graphene layer 604a and/or in the path of the incident light (e.g., incident far-field radiation), and the composition of the other materials can cause identifiable changes in the electrical potentials.

In some implementations, the example plasmon resonators 600a-600c can be operated as optical emitters. For example an electrical potential can be applied between predetermined combinations of one or more of the conductive segments 608a, the electrode 610a, and the electrode 612a. The electrical potentials can induce the plasmon resonator 600a to resonate and emit photons (e.g., light).

In some implementations, the example plasmon resonators 600a-600c can be operated as solid-state reflectors or as solid-state variable refractors. For example, the electrode 610a can be configured as an electrical source, the electrode 612a can be configured as an electrical drain, and one or more of the conductive segments 608a in the patterned layer 602a can be configured as an electrical gate. An electrical potential can be applied across the electrode 610a and the electrode 612a. The plasmon resonator 600a can be exposed to light, and a variable electrical potential can be applied to the one or more of the conductive segments 608a. As the electrical potential at the patterned layer 602a is varied, the effective refractive index of the plasmon resonator 600a can vary. In use, the electrical potential at the patterned layer 602a can be varied to controllably redirect (e.g., bend, alter, reorient) the direction of the applied light.

Figure 7:
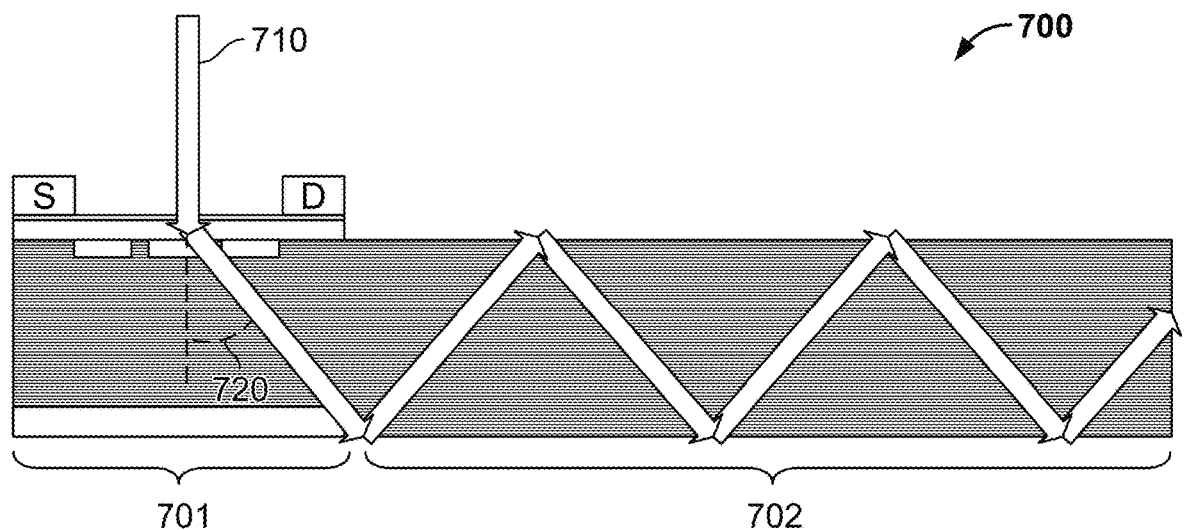
FIG. 7 shows a schematic example of a waveguide that includes a plasmon resonator.

FIG. 7 shows a schematic example of a waveguide 700 that includes a plasmon resonator 701. In some embodiments, the plasmon resonator 701 can be any of the example plasmon resonators 600a-600c. The waveguide 700 also includes a dielectric portion 702 configured to propagate electromagnetic energy (e.g., light). The dielectric portion 702 is configured to support one or more propagation modes. The electromagnetic waves in the waveguide 700 generally travel down the guide in a zig-zag path in which the energy is repeatedly reflected between opposite walls of the dielectric portion 702, with the waves confined to the dielectric by total internal reflection at its surface.

As discussed in proceeding paragraphs, the plasmon resonator 701 can be configured as a as a solid state reflector or solid state variable refractor. In the illustrated example, a beam of light 710 is directed at the plasmon resonator 701. An electrical bias can be applied to predetermined combinations of the graphene layer and the patterned layer to alter the effective refractive index of the plasmon resonator 701. In some embodiments of waveguide couplers, the geometrical dimensions of the waveguide 700 can be designed so that the waveguide 700 can couple narrow ranges of incident wavelengths to waveguide modes. In the illustrated example, the resonance wavelength can be tuned by applying electrical biases, and as such the plasmon resonator 701 can couple a broad range of incident wavelengths to the waveguide mode.

As the beam of light 710 passes through the electrically biased plasmon resonator 701, the beam of light 710 is coupled to a selected one of the modes of the dielectric portion 702 (e.g., a dominant waveguide mode). In the illustrated example, the beam of light 710 is redirected at an angle 720. The angle 720 can be controlled by controlling the electrical bias applied to the plasmon resonator 701. By extension, by controlling the electrical bias applied to the plasmon resonator 701, the beam of light 710 can be directed to a selected one of the modes of the dielectric portion 702.

Figure 8:
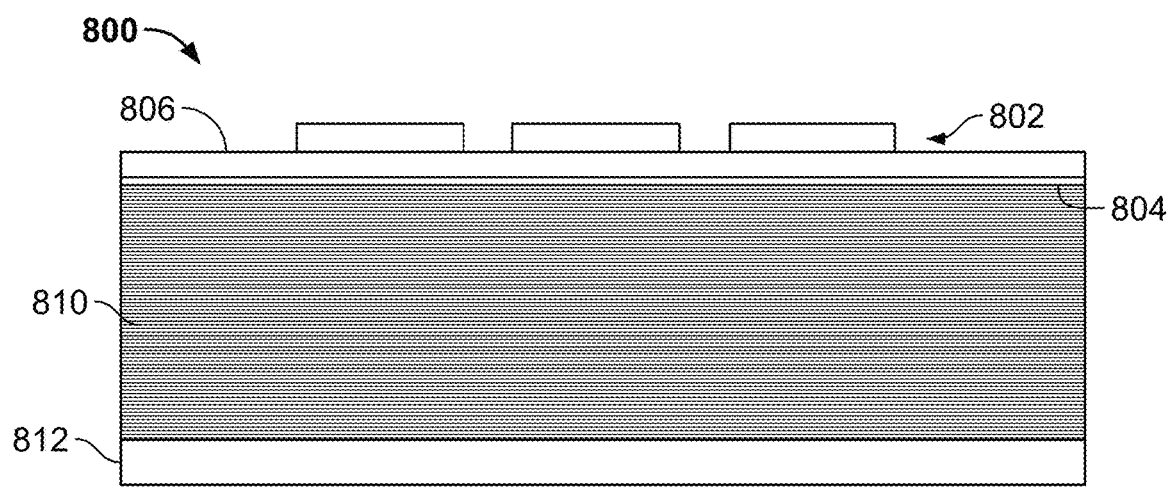
FIG. 8 shows another example of a plasmon resonator architecture.

FIG. 8 shows another example of an plasmon resonator 800. In general, the plasmon resonator 800 is modification of the plasmon resonators discussed in previous paragraphs, in which some of the layers have a relatively inverted arrangement that will be explained next.

The plasmon resonator 800 includes a patterned layer 802 and a graphene layer 804, with a spacer layer 806 in-between. The graphene layer 804 is proximal with an optical spacer layer 810 and a reflector layer 812. The patterned layer 802 is arranged on the opposite face of the graphene layer 804 from the patterned layer 802.

In some embodiments, the graphene layers described in any of the preceding paragraphs can be chemically doped in order to modify the charge carrier concentration of the graphene. For example, the graphene can be exposed to a solvent such as nitric acid.

In some embodiments, the graphene layers described in any of the preceding paragraphs can be optically doped in order to modify the charge carrier concentration of the graphene. For example, one or more of the plasmon resonators can be exposed to a predetermined amount of light in order to cause a predetermined amount of charge carrier concentration in the graphene.

In some embodiments, the graphene layers described in any of the preceding paragraphs can be replaced by other substantially two-dimensional (2D) materials that support plasmonic, phononic, or/and excitonic polaritons. For example, such materials can include black phosphorus, black arsenic phosphorous, molybdenum disulfide, hexagonal boron nitride, and combinations of these and any other appropriate 2D materials. Any of these materials, or combinations thereof, can be used in combination with or in place of the graphene layers.

Figure 9:
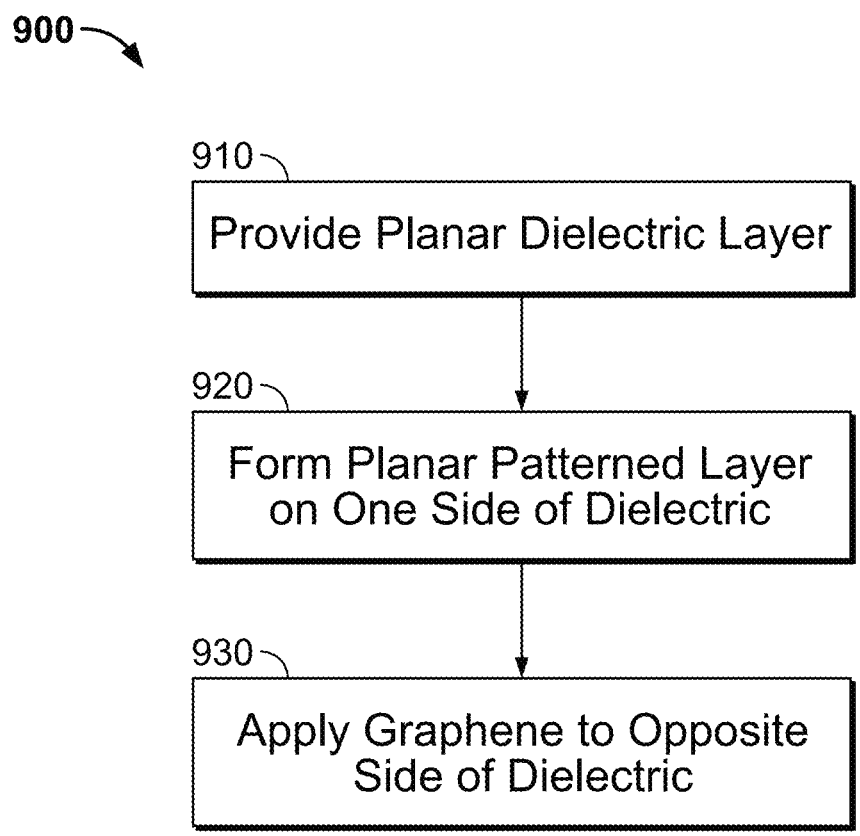
FIG. 9 is a flow diagram of an example process of making a plasmon resonator.

FIG. 9 is a flow diagram of an example process 900 of making an plasmon resonator. In some implementations, the process 900 can be used to make one or more of the plasmon resonators of FIGS. 1A-8. In some implementations, the process 900 can be performed at least in part as an atomic layer deposition (ALD) process.

At 910, a planar dielectric layer is provided. For example, the dielectric layer 606*a* of the example plasmon resonator 600*a* of FIG. 6A can be formed, deposited, or otherwise provided. In some embodiments, the dielectric layer 606*a* can be made of any material with substantially low optical loss at the frequencies of interest and whose thicknesses can be controlled with nanometer precision. Examples of such materials can include metal oxides (e.g., aluminum oxide, hafnium oxide, titanium oxide, zinc oxide, hydrogen silsesquioxane), semiconductors (e.g., silicon, germanium, gallium arsenide), polymers (e.g., poly(methyl methacrylate) (PMMA), polydimethylsiloxane (PDMS)), or open space (e.g., air gap).

In some implementations, providing the planar dielectric layer can include providing a substrate, forming a planar sacrificial layer on the substrate, and forming the planar dielectric layer on the planar sacrificial layer. For example, in order to promote the formation of a flat, planar dielectric layer, a thin layer of gold or other removable material can be applied to a flat silicon base plate. The dielectric layer 606*a* can then be formed upon the sacrificial layer.

At 920, a planar patterned layer is formed upon a first side of the planar dielectric layer. The planar patterned layer includes a collection of electrically conductive segments and a collection of dielectric segments, each dielectric segment defined between a corresponding pair of the electrically conductive segments. For example, referring to FIG. 6A, the pattered layer 602*a* can be formed as an alternating collection of the conductive segments 608*a* and the dielectric segments 609*a*.

In some embodiments, the collection of electrically conductive segments and the collection of dielectric segments are sized and spaced to define a resonance frequency corresponding to a predetermined wavelength of electromagnetic radiation. In some embodiments, the collection of electrically conductive segments and the collection of dielectric segments are sized and spaced to define multiple resonance frequencies corresponding to multiple predetermined orders of resonance.

In some embodiments, the predetermined wavelength is within an infrared spectrum of light, a visible spectrum of light, a terahertz spectrum of light, or a microwave spectrum of electromagnetic radiation. For example, the resonance frequency can be based on a spectrum that extends from wavelengths of about 700 nm to wavelengths of about 1 or 2 mm.

Returning to FIG. 9, at 930, a graphene layer is applied upon the planar dielectric layer opposite the planar patterned layer. For example, the graphene layer 604*a* is placed on a face of the dielectric layer 606*a* opposite the patterned layer 602*a*.

In some implementations, the substrate can be separated from the planar dielectric layer, the planar patterned layer, and the planar sacrificial layer prior to applying the graphene layer, and the planar sacrificial layer can be removed subsequent to separating the substrate and prior to applying the graphene layer. For example, the resonator can be removed from a silicon base and then the sacrificial (e.g., gold) layer can then be removed (e.g., etched). The graphene layer 604*a* can then be applied to the face of the dielectric layer 606*a* formerly covered by the sacrificial layer.

In some implementations, prior to applying the graphene layer, a spacer layer can be formed on the planar patterned layer, where the spacer layer can be substantially electromagnetically transparent to the predetermined wavelength of electromagnetic radiation, and a reflector layer can be formed on the spacer layer, where the reflector layer comprises a material that reflects the predetermined wavelength of electromagnetic radiation. For example, the optical spacer and the reflector shown in FIG. 1A can be formed. In some embodiments, the spacer layer can have a thickness of about one-quarter wavelength of the predetermined wavelength.

In some embodiments, the optical spacer layer can be formed of any appropriate material with substantially low optical loss. Materials having a large refractive index can be considered to reduce the required thickness for the optical spacer. Some examples include metal oxides (e.g., aluminum oxide, hafnium oxide, titanium oxide, zinc oxide, hydrogen silsesquioxane), semiconductors (e.g., silicon, germanium, gallium arsenide), polymers, (e.g., poly(methyl methacrylate) (PMMA), polydimethylsiloxane (PDMS)), and open space (e.g., air gap).

In some implementations, the process 900 can also include, prior to forming the spacer layer, forming an anti-reflective (e.g., index-matching) layer on the planar patterned layer, where the anti-reflective layer has a refractive index that is greater than a refractive index of and ambient environment and less than a refractive index of the planar spacer layer, and where the spacer layer is formed on and in contact with a surface of the refractive index matching layer. For example, FIG. 1A shows that a layer of alumina is formed between the metal ribbon array and the optical spacer. In some embodiments, the electrical insulator, the collection of electrically insulative segments, or both, can be formed from alumina. A thin film on the surface of the optical spacer can reduce reflectivity when the thin layer of material has a refractive index $n_1$ between the index $n_0$ of the incident environment (e.g., air) and the optical spacer (index $n_s$). An appropriate value of $n_1$ can be determined as:

$$n_1 = \sqrt{n_0 n_S}.$$ [EQUATION 3]

Even without an index matching layer, the graphene plasmon resonators described in this document can still work. In some implementations, the presence of index matching layer can help either tune the resonant absorption of the device, or/and adjust the target thickness of the optical spacer. In some implementations, the refractive index of the index matching layer can be designed based on numerical simulations according to these purposes. Other than the considerations on the refractive index, conditions similar to the case of gap materials hold and similar materials can be used. For example, metal oxides (e.g., aluminum oxide, hafnium oxide, titanium oxide, zinc oxide, hydrogen silsesquioxane), semiconductors (e.g., silicon, germanium, gallium arsenide), polymers (e.g., poly(methyl methacrylate) (PMMA), polydimethylsiloxane (PDMS)), or open space (e.g., air gap).

In some implementations, the process 900 can include applying light to the graphene plasmon resonator, generating an electrical potential in the planar patterned layer based on the light, and measuring the generated electrical potential. For example, the graphene plasmon resonator described herein can be used as spectrometers.

In some implementations, the process 900 can include applying light to the graphene plasmon resonator, applying an electrical bias to at least one of the planar patterned layer and the graphene layer, and modifying a trajectory of the light based on the electrical bias. For example, the graphene plasmon resonator described herein can be used as solid state reflectors or refractors that can bend or reflect beams of light in response to electrical stimulation.

In some implementations, the process 900 can include applying an electrical bias to at least one of the planar patterned layer and the graphene layer, and emitting light based on the electrical bias. For example, the graphene plasmon resonator described herein can be used as a light source by providing an electrical stimulation that causes the resonator to resonate and emit photons.

Although a few implementations have been described in detail above, other modifications are possible. For example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A graphene plasmon resonator, comprising:
    a planar patterned layer comprising:
        a plurality of electrically conductive segments; and
        a plurality of dielectric segments, each dielectric segment defined between a corresponding pair of the plurality of electrically conductive segments,
    wherein the plurality of electrically conductive segments and the plurality of dielectric segments are sized and spaced to establish a resonance frequency of a graphene plasmon mode, the resonance frequency corresponding to a predetermined wavelength of electromagnetic radiation;
    a graphene layer substantially parallel to the planar patterned layer and overlapping the plurality of electrically conductive segments; and
    a planar dielectric layer between the planar patterned layer and the graphene layer.

2. The graphene plasmon resonator of claim 1, wherein the predetermined wavelength of electromagnetic radiation is within an infrared spectrum of light.

3. The graphene plasmon resonator of claim 1, further comprising:
    a planar reflector layer comprising a reflective material arranged substantially parallel to the planar patterned layer opposite the graphene layer and configured to reflect the predetermined wavelength of electromagnetic radiation; and
    a planar spacer layer, wherein the planar spacer layer is arranged between the planar reflector layer and the planar patterned layer, and wherein the planar spacer layer is configured to be substantially electromagnetically transparent to the predetermined wavelength of electromagnetic radiation.

4. The graphene plasmon resonator of claim 3, wherein the planar reflector layer is spaced apart from the planar patterned layer by a distance of about one-quarter wavelength of the predetermined wavelength of electromagnetic radiation.

5. The graphene plasmon resonator of claim 3, further comprising a planar refractive layer arranged between the planar patterned layer and the planar spacer layer, the planar refractive layer comprising a material having a refractive index that is greater than a refractive index of an ambient environment and less than a refractive index of the planar spacer layer.

6. The graphene plasmon resonator of claim 1, wherein the planar dielectric layer, the plurality of dielectric segments, or both, comprise alumina.

7. The graphene plasmon resonator of claim 1, further comprising a waveguide comprising a dielectric segment arranged substantially parallel to the graphene plasmon resonator, wherein the dielectric segment defines a major axis and is sized to support a waveguide mode that propagates along the major axis.

8. The graphene plasmon resonator of claim 7, wherein the graphene plasmon resonator is configured to couple incident far-field radiation to the waveguide mode.

9. The graphene plasmon resonator of claim 8, wherein the waveguide has a dominant waveguide mode, and a frequency of the dominant waveguide mode is based on a resonance of the graphene plasmon resonator.

10. The graphene plasmon resonator of claim 1, wherein one or more electrically conductive segments of the plurality of electrically conductive segments are configured to be electrically biased.

11. The graphene plasmon resonator of claim 1, comprising an electrode in electrical contact with the graphene layer.

12. The graphene plasmon resonator of claim 1, wherein a first electrically conductive segment of the plurality of electrically conductive segments has a width, in a direction along which the plurality of electrically conductive segments are arrayed, in a range from 45 nm to 85 nm.

13. The graphene plasmon resonator of claim 1, wherein the plurality of electrically conductive segments are in the planar dielectric layer.

14. The graphene plasmon resonator of claim 1, wherein a first electrically conductive segment of the plurality of electrically conductive segments has a first width in a direction along which the plurality of electrically conductive segments are arrayed, wherein a second electrically conductive segment of the plurality of electrically conductive segments has a second width in the direction along which the plurality of electrically conductive segments are arrayed, and wherein the first width is different from the second width.

15. The graphene plasmon resonator of claim 1, wherein a spacing between adjacent ones of the plurality of electrically conductive segments, in a direction along which the plurality of electrically conductive segments are arrayed, is less than a width of a first electrically conductive segment of the plurality of electrically conductive segments, in the direction along which the plurality of electrically conductive segments are arrayed.

* * * * *